(12) United States Patent
Connor

(10) Patent No.: US 9,549,283 B2
(45) Date of Patent: Jan. 17, 2017

(54) SYSTEMS AND METHODS FOR DETERMINING THE PRESENCE OF A PERSON

(71) Applicant: ANAESTHESIA ASSOCIATES OF MASSACHUSETTS, P.C., Westwood, MA (US)

(72) Inventor: Christopher William Connor, Arlington, MA (US)

(73) Assignee: ANAESTHESIA ASSOCIATES OF MASSACHUSSETTS, P.C., Westwood, MA (US)

(*) Notice: Subject to any disclaimer, the term of this patent is extended or adjusted under 35 U.S.C. 154(b) by 0 days.

(21) Appl. No.: 14/490,162

(22) Filed: Sep. 18, 2014

(65) Prior Publication Data

US 2016/0088430 A1     Mar. 24, 2016

(51) Int. Cl.
| | | |
|---|---|---|
| H04W 24/00 | (2009.01) | |
| H04W 4/02 | (2009.01) | |
| G06F 17/30 | (2006.01) | |
| H04L 29/08 | (2006.01) | |
| G06Q 10/10 | (2012.01) | |

(52) U.S. Cl.
CPC .......... H04W 4/02 (2013.01); G06F 17/30061 (2013.01); G06F 17/30589 (2013.01); G06Q 10/1091 (2013.01); H04L 67/22 (2013.01)

(58) Field of Classification Search
CPC ... H04W 4/02; H04W 24/00; G06F 17/30061; G06F 17/30589; G06Q 10/1091; H04L 67/22

USPC .............. 455/456.1, 456.3, 435.1
See application file for complete search history.

(56) References Cited

U.S. PATENT DOCUMENTS

| | | | |
|---|---|---|---|
| 8,340,688 | B2 | 12/2012 | Brown |
| 8,577,392 | B1 | 11/2013 | Pai et al. |
| 8,896,441 | B2 | 11/2014 | Mohandes |
| 2002/0042278 | A1* | 4/2002 | Crockett et al. .............. 455/456 |
| 2002/0164993 | A1 | 11/2002 | Elliot |
| 2004/0153664 | A1* | 8/2004 | Rossler et al. ................ 713/200 |
| 2005/0075116 | A1* | 4/2005 | Laird et al. ................ 455/456.3 |
| 2007/0093237 | A1 | 4/2007 | Bayne |
| 2010/0014676 | A1* | 1/2010 | McCarthy ............. G06F 21/552 380/277 |
| 2010/0234046 | A1* | 9/2010 | Wood .................... H04W 64/00 455/456.3 |
| 2012/0009897 | A1* | 1/2012 | Kasad ................... H04L 63/107 455/411 |
| 2012/0077493 | A1* | 3/2012 | Robbins et al. ........... 455/435.1 |

(Continued)

Primary Examiner — Mong-Thuy Tran
(74) Attorney, Agent, or Firm — Ropes & Gray LLP

(57) ABSTRACT

A method, device, or system is arranged to determine the presence of a person. The system includes a data store that stores a plurality of locations and stores a subset of the plurality of locations. The system includes a server in communication with the data store that is arranged to i) associate the subset of locations of the plurality of locations with the person and ii) associate a mobile device with the person. The system also includes a mobile device arranged to i) monitor the geographic position of the mobile device, ii) store the subset of the plurality of locations, iii) determine that the geographic position of the mobile device is within a vicinity of a first location of the subset of locations; and iv) provide a first indication that the mobile device is within the vicinity of the first location.

23 Claims, 14 Drawing Sheets

(56) References Cited

U.S. PATENT DOCUMENTS

2014/0187266 A1* 7/2014 Nawaz ................ H04W 12/02
                                                    455/456.3
2015/0081367 A1* 3/2015 Westlake ......... G06Q 10/06311
                                                    705/7.15

* cited by examiner

Anaesthesia
Associates
of Massachusetts

Stat!

Configure my locations for Employee A

Choose the locations that your app should know about, based on your credentials, up to a maximum of 20 locations.
Click Submit to upload your list to the Stat! server.
Click Cancel to leave your selections unmodified.

| Location | State | Location | State |
|---|---|---|---|
| BMC East Newton | ON | BMC Menino | ON |
| BOSS | OFF | Charlton | OFF |
| Chiefs Meeting | ON | Childrens | OFF |
| CREC | OFF | eICU | OFF |
| FS | OFF | Hawthorne | OFF |
| Holy Family | OFF | Hyde Park | OFF |
| MAH | ON | Melrose | OFF |
| Norton | OFF | Nashoba | OFF |
| NEBH | ON | NEBOCC | ON |
| OBA Bartlett | OFF | OBA Davidson | OFF |
| OBA Nevins | OFF | OGI Attleboro | OFF |
| OGI Lincoln | OFF | One Brookline | ON |
| OSC | OFF | QMC | OFF |
| SC-W | OFF | SCSC | OFF |
| Shattuck | ON | SLH | OFF |
| Westwood | ON | | |

Submit    Cancel

BMC Menino         iOS 7.10 (1.52)    1E6E38F0BABA1A00A339625CC4F9E47B18ED8DBB
BMC Menino         iOS 7.10 (1.52)    1E6E38F0BABA1A00A339625CC4F9E47B18ED8DBB
BMC Menino         iOS 7.10 (1.52)    1E6E38F0BABA1A00A339625CC4F9E47B18ED8DBB
BMC Menino         iOS 7.10 (1.52)    1E6E38F0BABA1A00A339625CC4F9E47B18ED8DBB
BMC Menino         iOS 7.10 (1.52)    1E6E38F0BABA1A00A339625CC4F9E47B18ED8DBB
BMC Menino         iOS 7.10 (1.52)    1E6E38F0BABA1A00A339625CC4F9E47B18ED8DBB
BMC Menino         iOS 7.10 (1.52)    1E6E38F0BABA1A00A339625CC4F9E47B18ED8DBB
BMC Menino         iOS 7.10 (1.52)    1E6E38F0BABA1A00A339625CC4F9E47B18ED8DBB
BMC Menino         iOS 7.10 (1.52)    1E6E38F0BABA1A00A339625CC4F9E47B18ED8DBB
BMC Menino         iOS 7.10 (1.52)    1E6E38F0BABA1A00A339625CC4F9E47B18ED8DBB
BMC Menino         iOS 7.10 (1.52)    1E6E38F0BABA1A00A339625CC4F9E47B18ED8DBB
BMC East Newton    iOS 7.10 (1.52)    1E6E38F0BABA1A00A339625CC4F9E47B18ED8DBB
BMC East Newton    iOS 7.10 (1.52)    1E6E38F0BABA1A00A339625CC4F9E47B18ED8DBB
BMC East Newton    iOS 7.10 (1.52)    1E6E38F0BABA1A00A339625CC4F9E47B18ED8DBB
BMC East Newton    iOS 7.10 (1.52)    1E6E38F0BABA1A00A339625CC4F9E47B18ED8DBB
BMC East Newton    iOS 7.10 (1.52)    1E6E38F0BABA1A00A339625CC4F9E47B18ED8DBB
BMC East Newton    iOS 7.10 (1.52)    1E6E38F0BABA1A00A339625CC4F9E47B18ED8DBB
BMC East Newton    iOS 7.10 (1.52)    1E6E38F0BABA1A00A339625CC4F9E47B18ED8DBB
BMC East Newton    iOS 7.10 (1.52)    1E6E38F0BABA1A00A339625CC4F9E47B18ED8DBB
BMC East Newton    iOS 7.10 (1.52)    1E6E38F0BABA1A00A339625CC4F9E47B18ED8DBB
BMC East Newton    iOS 7.10 (1.52)    1E6E38F0BABA1A00A339625CC4F9E47B18ED8DBB
BMC East Newton    iOS 7.10 (1.52)    1E6E38F0BABA1A00A339625CC4F9E47B18ED8DBB
BMC East Newton    iOS 7.10 (1.52)    1E6E38F0BABA1A00A339625CC4F9E47B18ED8DBB
BMC East Newton    iOS 7.10 (1.52)    1E6E38F0BABA1A00A339625CC4F9E47B18ED8DBB
BMC East Newton    iOS 7.10 (1.52)    1E6E38F0BABA1A00A339625CC4F9E47B18ED8DBB
BMC East Newton    iOS 7.10 (1.52)    1E6E38F0BABA1A00A339625CC4F9E47B18ED8DBB
                   iOS 7.10 (1.52)    1E6E38F0BABA1A00A339625CC4F9E47B18ED8DBB
                   iOS 7.10 (1.52)    1E6E38F0BABA1A00A339625CC4F9E47B18ED8DBB
                   iOS 7.10 (1.52)    1E6E38F0BABA1A00A339625CC4F9E47B18ED8DBB
                   iOS 7.10 (1.52)    1E6E38F0BABA1A00A339625CC4F9E47B18ED8DBB
                   iOS 7.10 (1.52)    1E6E38F0BABA1A00A339625CC4F9E47B18ED8DBB
                   iOS 7.10 (1.52)    1E6E38F0BABA1A00A339625CC4F9E47B18ED8DBB
                   iOS 7.10 (1.52)    1E6E38F0BABA1A00A339625CC4F9E47B18ED8DBB
                   iOS 7.10 (1.52)    1E6E38F0BABA1A00A339625CC4F9E47B18ED8DBB
                   iOS 7.10 (1.52)    1E6E38F0BABA1A00A339625CC4F9E47B18ED8DBB
                   iOS 7.10 (1.52)    1E6E38F0BABA1A00A339625CC4F9E47B18ED8DBB
                   iOS 7.10 (1.52)    1E6E38F0BABA1A00A339625CC4F9E47B18ED8DBB
                   iOS 7.10 (1.52)    1E6E38F0BABA1A00A339625CC4F9E47B18ED8DBB
                   iOS 7.10 (1.52)    1E6E38F0BABA1A00A339625CC4F9E47B18ED8DBB
                   iOS 7.10 (1.52)    1E6E38F0BABA1A00A339625CC4F9E47B18ED8DBB
                   iOS 7.10 (1.52)    1E6E38F0BABA1A00A339625CC4F9E47B18ED8DBB
```

```
/ Stat! Dashboard         X \
← → C  ⬜ stat.plexusmg.com/AAM/dashboard
```

| GPS | Leaving Order | Facility Staffing | MD Week | CRN |

Monday  [June ⇵] [19 ⇵]

A MD Week To Date

— 802                                                            — 803

[Alphabetical Sort]

| MD | MONDAY | | TUESDAY | | WEDNESDAY | |
|---|---|---|---|---|---|---|
| ADA | | | OBA Bartlett | Tue 07:00 - Tue 16:00 | NEBH | Wed 06:23 - Wed 19:28 |
| | | | | | NEBH | Wed 07:00 - Wed 20:00 |
| ALD | MAH | Mon 06:32 (?) - Mon 20:55 | MAH | Tue 10:03 - Tue 19:47 | MAH | Wed 06:08 - Wed 17:23 (?) |
| | MAH | Mon 07:00 - Mon 16:00 | MAH | Tue 07:00 - Tue 17:00 | MAH | Wed 07:00 - Wed 16:00 |
| AMO | Nashoba | Mon 07:18 - Mon 15:09 | Nashoba | Tue 07:26 - Tue 16:06 | Nashoba | Wed 07:19 - Wed 16:23 |
| | MAH | Mon - 16:52 - Mon 20:45 | Nashoba | Tue 07:00 - Tue 14:00 | Nashoba | Wed 07:00 - Wed 16:00 |
| | MAH, Nashoba | Mon 07:00 - Mon 20:00 | | | | |
| BIC | SLH | Mon 06:51 - Mon 18:03 | Hawthorne | Tue 06:52 - Tue 12:56 | SLH | Wed 11:01 - Wed 15:04 |
| | SCSC | Mon 07:00 - Mon 16:00 | SLH | Tue 13:15 - Tue 15:12 | SLH | Wed 07:00 - Wed 16:00 |
| | | | Hawthorne | Tue 07:00 - Tue 16:00 | | |
| BIE | BMC Menino | Mon 06:47 - Mon 16:54 | BMC Menino | Tue 06:44 - Tue 14:15 | One Brookline | Wed 06:47 - Wed 14:06 |
| | BMC | Mon 07:00 - Mon 16:00 | BMC East Newton | Tue 14:16 - Tue 18:50 | NEBSC | Wed 07:00 - Wed 14:00 |
| | | | BMC | Tue 07:00 - Tue 20:00 | | |
| BLI | SLH | efore Mon 06:00 - Mon 07:41 | Morton | Tue 06:55 - Tue 15:16 | | |
| | SLH | efore Mon 06:00 - Mon 07:00 | Hawthorne | Tue 16:11 - Tue 18:23 | | |
| | | | Morton | Tue 07:00 - Tue 16:00 | | |
| BLO | | | One Brookline | Tue 07:01 - Tue 12:58 | | |
| | | | eICU | Tue 18:56 - Tue 19:42 (?) | eICU | efore Wed 05:00 - Wed 07:07 |
| | | | eICU | Wed 00:16 - after Wed 05:00 | NEBSC, eICU | efore Wed 05:00 - Wed 07:00 |
| | | | NEBSC, eICU | Tue 07:00 - after Wed 05:00 | | |
| BUR | BMC Menino | Mon 07:12 - Mon 12:14 | MAH | Tue 06:52 - Tue 17:31 | MAH | Wed 06:52 - Wed 13:38 |
| | BMC | Mon 07:00 - Mon 16:00 | MAH | Tue 07:00 - Tue 20:00 | MAH | Wed 07:00 - Wed 14:00 |
| CHA | BMC East Newton | Mon 15:19 - after Tue 05:00 | BMC East Newton | Before Tue 05:00 - Tue 09:14 | BMC East Newton | Wed 08:58 (?) - Wed 14:38 |
| | | | | | BMC Menino | Wed 14:35 - Wed 19:05 |
| | BMC SICU | Mon 15:00 - after Tue 05:00 | BMC SICU | Before Tue 05:00 - Tue 07:00 | BMC East Newton | Wed 19:09 - Wed 20:18 |
| | | | | | BMC | Wed 07:00 - Wed 20:00 |
| CQC | | | | | BMC Menino | Wed 06:16 - Wed 21:49 |
| | | | | | BMC | Wed 07:00 - Wed 20:00 |
| CON | | | BMC Menino | Tue 06:53 - Tue 18:34 | | |
| | | | BMC East Newton | Tue 18:34 - Tue 20:25 | Westwood | Wed 08:36 - Wed 17:09 |
| | | | BMC | Tue 07:00 - Tue 20:00 | | |
| DOU | MAH | Mon 07:00 - Mon 15:35 | NEBH | Tue 06:48 - Tue 17:27 | NEBH | Wed 07:00 - Wed 15:12 |
| | MAH | Mon 07:00 - Mon 16:00 | NEBH | Tue 07:00 - Tue 16:00 | NEBH | Wed 07:00 - Wed 16:00 |
| DZ | NEBOCC | Mon 13:55 (?) - Mon 15:32 | Pain | Tue 07:00 - Tue 16:00 | Pain | Wed 07:00 - Wed 16:00 |
| | Pain | Mon 07:00 - Mon 16:00 | | | | |

FIG. 8A

|  | A Week | RN Week | Weekend Review | Facility Load |
| --- | --- | --- | --- | --- |
| 2014 | 16 | 10 | | Excel Exporter |

Week 25 of 2014

806
804

Facility/Delta Sort

| THURSDAY | | FRIDAY | | Hours | At | Delta |
| --- | --- | --- | --- | --- | --- | --- |
| NEBH | Thu 14:15 - Thu 14:58 | BOSS | F 06:11 - F 14:50 | 21.3 | | -17.0 |
| OBA Bartlett | Thu 07:00 - Thu 14:00 | BOSS | F 07:00 - F 16:00 | | | |
| MAH | Thu 06:50 - Thu 20:01 | | | 47.1 | | 10.1 |
| MAH | Thu 07:00 - Thu 16:00 | | | | | |
| Nashoba | Thu 07:30 - Thu 13:30 | Nashoba | F 07:35 (?) - F 15:10 | 50.5 | | -0.6 |
| Nashoba | Thu 07:00 - Thu 16:00 | BMC East Newton | F 14:22 - F 20:51 | | | |
| | | BMC, Nashoba | F 07:00 - F 20:00 | | | |
| SLH | Thu 06:57 - Thu 13:20 | | | 29.7 | | -9.5 |
| SLH | Thu 07:00 - Thu 16:00 | | | | | |
| SC-W | Thu 05:27 - Thu 15:40 | SC-W | F 06:44 - F 14:06 | 43.3 | | -3.7 |
| SC-W | Thu 07:00 - Thu 16:00 | SC-W | F 07:00 - F 16:00 | | | |
| Hawthorne | Thu 06:40 - Thu 15:14 | Hawthorne | F 06:41 - F 13:24 | 31.1 | | 4.1 |
| SLH | Thu 15:37 - Thu 17:38 | Hawthorne | F 07:00 - F 14:00 | | | |
| Hawthorne, SLH | Thu 07:00 - Thu 16:00 | | | | | |
| One Brookline | Thu 06:59 - Thu 13:37 | BMC East Newton | F 08:55 - F 14:49 | 38.4 | | -1.6 |
| NEBH | Thu 13:41 - Thu 18:53 | MAH | F 21:58 - after Sat 05:00 | | | |
| NEBH | Thu 07:00 - Thu 16:00 | BMC | F 07:00 - F 14:00 | | | |
| BMC East Newton | Thu 05:55 - Fri 00:31 (?) | BMC, BMC SICU | Before F 05:00 - F 07:00 | 39.7 | | -12.3 |
| BMC, BMC SICU | Thu 07:00 - after Fri 05:00 | | | | | |
| | | BMC East Newton | F 15:07 - after Sat 05:00 | 52.0 | | 9.0 |
| BMC East Newton | Thu 06:58 - Thu 15:48 | | | | | |
| | | BMC SICU | F 15:00 - after Sat 05:00 | | | |
| BMC Menino | Thu 06:24 - Thu 15:31 | BMC East Newton | F 06:36 (?) - F 21:01 | 38.4 | | 6.4 |
| BMC | Thu 07:00 - Thu 14:00 | BMC | F 07:00 - F 20:00 | | | |
| BMC East Newton | Thu 05:43 - Thu 14:59 | | | 40.2 | | 17.2 |
| BMC Menino | Thu 14:59 - Thu 20:23 | Offsite | F 07:05 - F 14:56 | | | |
| BMC | Thu 07:00 - Thu 20:00 | | | | | |
| NEBH | Thu 07:03 - Thu 15:21 | OBC | F 07:21 - F 14:03 (?) | 44.2 | | -0.9 |
| NEBH | Thu 07:00 - Thu 16:00 | OSC | F 07:00 - F 16:00 | | | |
| Pain | Thu 07:00 - Thu 16:00 | BOSS | F 07:44 - F 13:08 (?) | 7.0 | | -30.0 |
| | | Pain | F 07:00 - F 16:00 | | | |

STAT/SCHX

| AAM | Page 1 of 2 | | Schedule Review: | | AMO/CK | | |
|---|---|---|---|---|---|---|---|
| BH | | | Shattuck | | MAH | BMC | |
| ( ELK ) | vit | 9 | | | ( SAR 7 ) | kmi 7a-7a | MAC 7 | RES 7 |
| CON | red | 6:30-8 | JSG | | WUR | abu 7.3 | ZAC 7 | nca 8:45 |
| ( AMO ) | mag | 7.3 | RPL 4 | | ALD | oox 5.3 | SEK | |
| SAN | bur | 7 | | | WAN | ber C | KOT | kir 7.3 |
| RIO | mar | 630A-7 | | | BUR | dea | ( ORT ) | com 7.3 |
| ( JPM ) | lmc | 5.3 | | | JAI | don | ( COC ) | elr 5.3 |
| NOR oc | mso | 5.3 | | | JMH | fra | REN | |
| BAT oc | mcc | 5.3 | NEBOCC 645a | | ZHA | sch | LOU | hol 5.3 |
| RPS | pet | 5.3 | KHO | | | raz | GUS oc | mmu 5.3 |
| | patL | 5.3 | LSA oc | | | | EBR oc | gar 5.3 |
| | kscL | 5.3 | EST | | | | GON oc | |
| | mcsL | 5.3 | | | | | MEK oc | jro 5.3 |
| | sanL | 5.3 | | | | | FEL | puc 5.3 |
| | geiL | 5.3 | | | | | KUR | jha 5.3OT |
| | deg | 5.3OT | | | | | KAL | |
| | sle | | | | RJM * | | ROD oc | mac |
| | gal | | | | PAIN: | NONE | | rob |
| | | | PAIN: | DZ | RN: Ca | RN: Kc | | sfo |
| | | | NEBSC | | QMC | | | |
| | | | | | GUF | bot | | del |
| | | | | | JFE | amb | | men OT |
| | | | CLOSED | | | man | 7p-7a | eICU |
| | | | | | | | * | PCeICU |
| | | | | | | | VAL | SICU AM |
| | | | | | | | ( JFE ) | SICU PM |
| | | | NASHOBA | | | | * | PCHT |
| | | | AMO | hubl | | | STA * | PCMP1 |
| * | | | | ooo | * | | ION * | PCMP2 |
| PAIN: | | NONE | | | PAIN: | STE | LOP * | PCICU |
| RN: | Rh: | Bz | | | RN: | Cc | RN: | |
| RN: | | Np | | | RN: | | PAIN: | ELK |
| NOTE: Urgent medical events that require reporting & assistance right away: | | | | | | | | |
| 1. Speak with Chief or Call Team Coordinator | | | | | | | | |
| 2. Call Mary Smith - Office 781-555-1234, Page 781-555-1235, cell 781-555-1236, Home | | | | | | | | |

FIG. 10A

| Monday, June 23, 2014 | | | FINAL | |
|---|---|---|---|---|
| MEL/WAK | | OSC | BOSS 645a | |
| (DOU 7) | | ATT | HER | |
| BIS 2nd | | DOU | ZEG oc | |
| ZHX 3rd | | RIS | FLA oc | |
| | | CHMC: | | |
| | | SC-W 7:30 | PAIN: | VAY |
| | | KIM | CREC 730a | |
| RAS * | | KUB | MCB oc | |
| HOLY FAMILY | | | KAZ | |
| 3 | girL | | DR. XXX 8A | |
| | | FS (IVF-D) 9A | SAR | |
| | | TRE oc | | |
| | | HYDE PARK PN | OBA2 | |
| | | RFF | NONE | |
| | | OGI PAIN | OTHER | |
| | | PAIN: | NONE | |
| | | NOTES/COMMENT/MESSAGES | | |
| * | | BH- JPM= BLOCKS | | |
| CALL TEAM | | BH- ELK to join call after PAIN] | | |
| CTC = | AMO | BH- AMO to join call after NASHOBA | | |
| #781-555-1234 | | MAH- SAR to join call after Dr. XXX | | |
| SEK  KOT  ELK  ORT | | QMC - ECT's @6:45am | | |
| GUF  WUR  COC  REN | | BMC- ORT, COG to join call after NCD | | |
| CON | | | | |
| ELK | COC | | | |
| | | Scheduling Office: Phone: 781-555-1234 / Fax: 781-555-1239 | | |
| 617-555-1237 | | | 6/20/14 3:24 PM | |

FIG. 10B

SYSTEMS AND METHODS FOR DETERMINING THE PRESENCE OF A PERSON

TECHNICAL FIELD

This disclosure relates to location monitoring and positioning systems, and particularly to determining the presence of a person.

BACKGROUND

Entities such as corporations, associations, and government organizations have traditionally monitored an individual's presence at the entity's facilities to ensure that the individual has been present to perform assigned tasks or duties. Companies have typically monitored when an employee arrives and departs from their workplace. For example, companies have required employees to use timecards that are time-stamped to validate when an employee arrives or departs from work.

There is an administrative burden associated with tracking when employees or individuals enter or leave a workplace. Typically, a supervisor or other administrator must collect timecards to confirm that employees were present and calculate the amount of time that the employee was present. Alternatively, employees can prepare and submit timecards manually or electronically. However, such a process is burdensome and time-consuming to employees. Accordingly, there is a need to enhance the ability of an entity to monitor the presence of employees or individuals associated with the entity in a less obtrusive and more cost-efficient manner.

In certain circumstances, employees or individuals may be required to perform their duties or be present at multiple facilities that are geographically separated from each other, but at different time periods. Hence, it becomes substantially more difficult to track the presence of an employee among multiple facilities at different times. Accordingly, there is a need to enable efficient monitoring or tracking of the presence of employees or individuals associated with the entity when the individuals perform their duties or move among multiple different facilities.

An entity such as a company must manage and coordinate the work schedules of multiple employees. In certain circumstances, the entity must coordinate work schedules of individuals that work and move among multiple facilities. To coordinate work schedules, administrators typically gather individual work schedules, gather information regarding the future availability of individuals, determine the production or service needs of the entity, and then determine the schedules of each of the multiple individuals to meet the needs of the entity. Again, such a process can be time-consuming and burdensome on supervisors and administrators. Accordingly, there is a need to enable more efficient scheduling of work among multiple individuals moving among multiple facilities.

SUMMARY

The application, in various embodiments, addresses the deficiencies of current personnel tracking and scheduling systems by providing systems and methods that enable less-obtrusive and more cost-efficient monitoring of the presence of persons, even at multiple locations.

In one aspect, a system for determining the presence of a person includes a data store that stores a plurality of locations and stores a subset of the plurality of locations. The system also includes a server in communication with the data store that is arranged to i) associate the subset of locations of the plurality of locations with the person and ii) associate a mobile device with the person. The mobile device is arranged to i) monitor the geographic position of the mobile device, ii) store the subset of the plurality of locations, iii) determine that the geographic position of the mobile device is within a vicinity of a first location of the subset of locations; and iv) provide a first indication that the mobile device is within the vicinity of the first location.

In one implementation, the mobile device also determines that the geographic position of the mobile device is not within the vicinity of the first location and provides a second indication that the mobile device has departed from the vicinity of the first location.

The server may store history data in the data store associated with a presence of the mobile device at the subset of locations. The server may analyze the history data to determine presence information associated with the person. The server may use the presence information associated with the person to determine a future presence schedule for the person. In one configuration, the system includes a client having a user interface arranged to receive a user input to configure the subset of locations.

In one implementation, determining that a mobile device is or is not within the vicinity of the location is based on at least one of a distance between the mobile device and the first location, a distance between the mobile device and an access point, and whether the mobile device is connected to or communicating with one or more access points. The first indication may include an arrival or presence notification. The second indication may include a departure notification.

The mobile device may include at least a cellular telephone, a personal digital assistant, a mobile computer, a smart phone, a radio frequency identifier, or a wireless communications device. A person may be an employee of a company, a member of a private or governmental organization, or a member of an association. The plurality of locations may include a worksite, an office, a facility, the person's home, a residence, a vehicle, or a location where the person's presence is scheduled.

In another aspect, a mobile device includes a memory that stores a subset of locations of a plurality of locations. The mobile device also includes a processor arranged to i) monitor the geographic position of the mobile device, ii) receive the subset of the plurality of locations from a server, iii) determine that the geographic position of the mobile device is within a vicinity of a first location of the subset of locations; and iv) provide, to the server, a first indication that the mobile device is within the vicinity of the first location.

DRAWINGS

The foregoing and other objects and advantages of the invention will be appreciated more fully from the following further description thereof, with reference to the accompanying drawings. The skilled person in the art will understand that the drawings, described below, are for illustration purposes only. The drawings are not intended to limit the scope of the applicant's teaching in any way.

FIG. 1 shows the general architecture of a presence monitoring system according to illustrative aspect of the invention.

FIG. 2 includes a functional block diagram of a computer system that may be used by a mobile device, server, client, kiosk, or other component shown in FIG. 1.

FIG. 4 shows a screen shot of an exemplary user interface arranged to receive a user input to configure the subset of locations associated with a person.

Figure 5A:

FIGS. 5A-B show a portion of an exemplary data log file showing when a person arrived, was present, and departed a location.

FIG. 6 shows a screen shot of an exemplary user interface arranged to receive a user input to indicate when a person has arrived or departed from a location.

Figure 7:
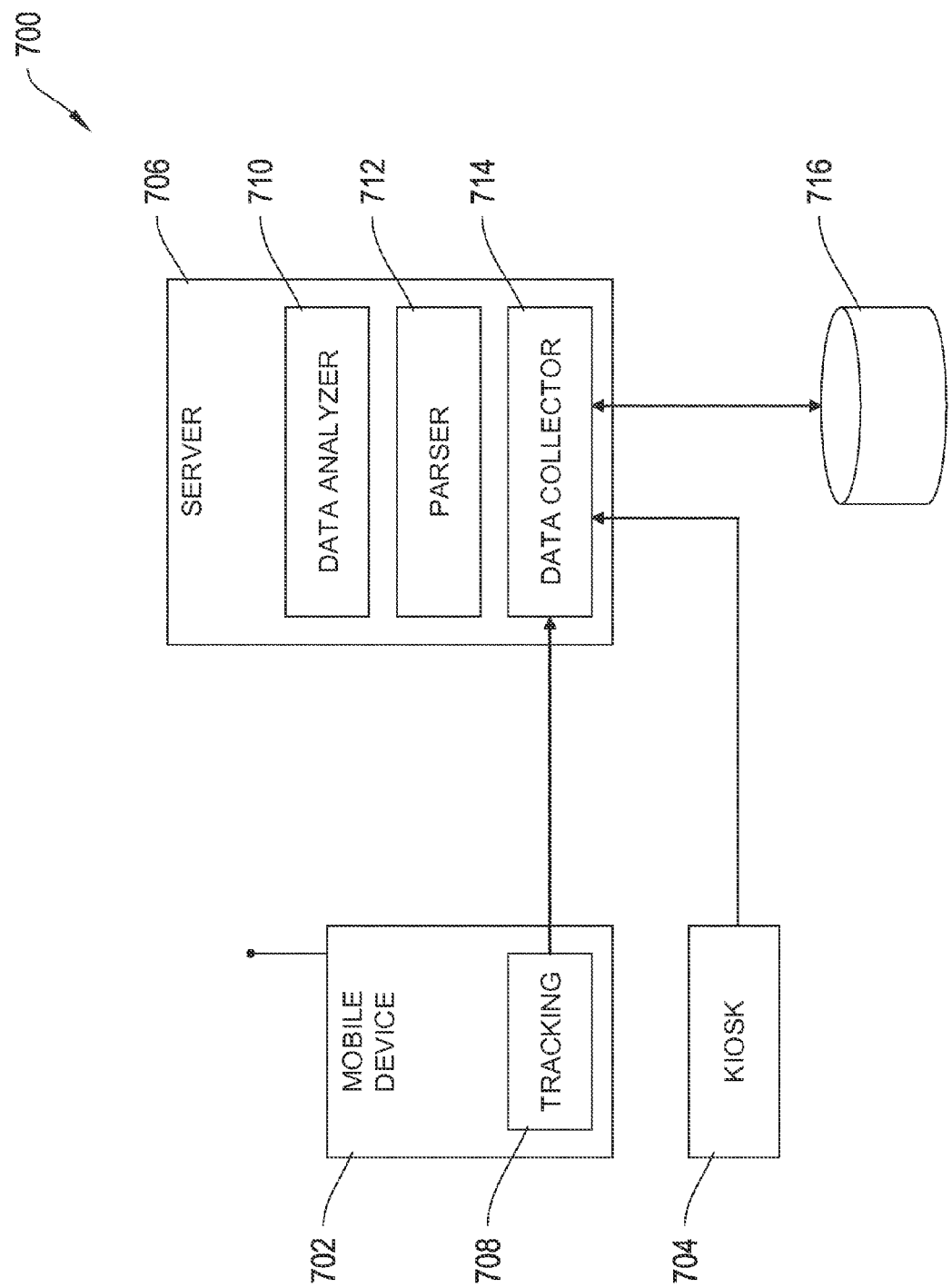

FIG. 7 includes a functional block diagram of mobile device and server of a presence monitoring system.

FIGS. 8A-B include an exemplary processed data output page showing a person's presence at multiple facilities over a week period.

Figure 9:
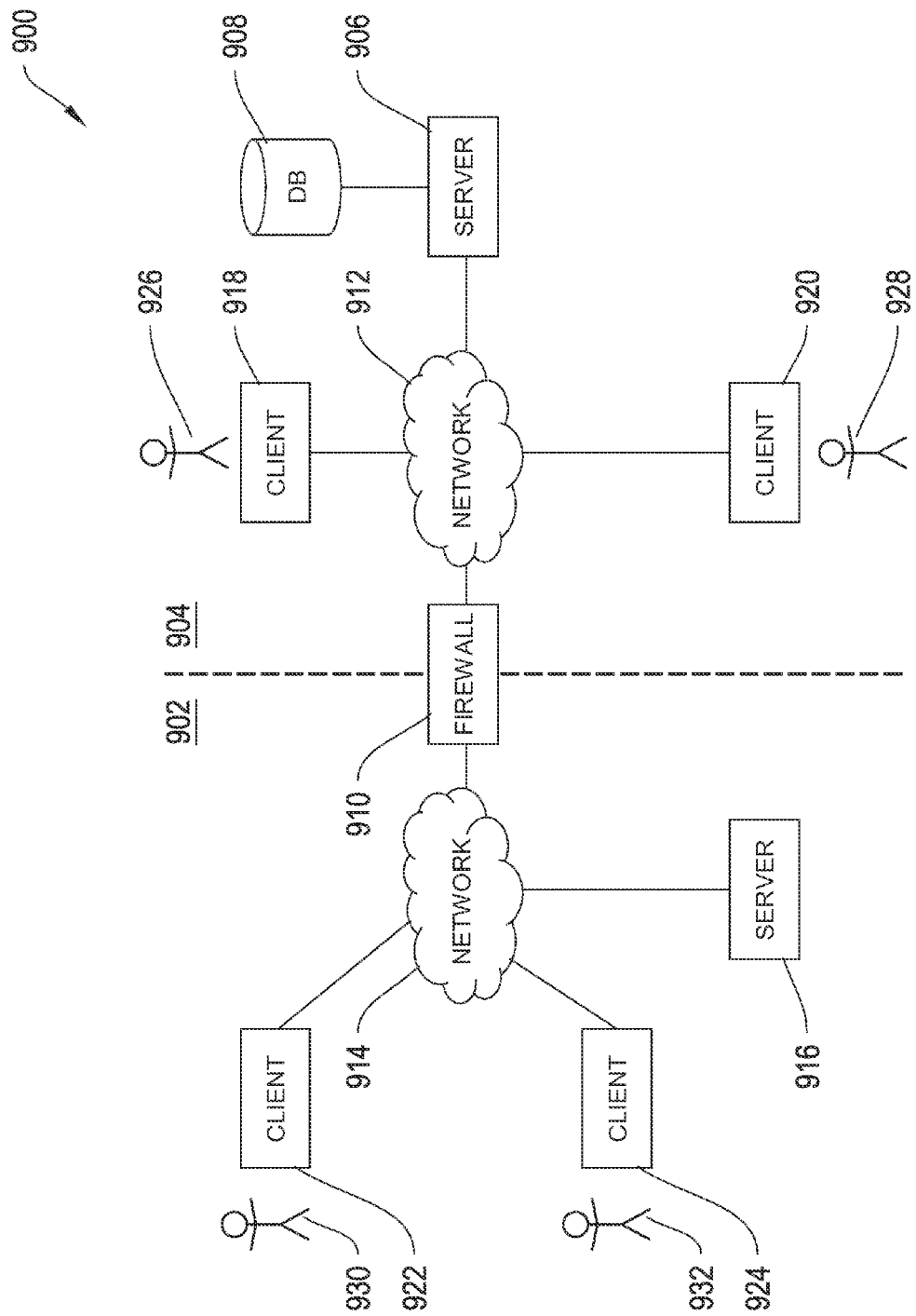

FIG. 9 includes a functional block diagram of a configuration of the presence monitoring system where certain data is protected from public access.

FIGS. 10A-B show a screen shot of an exemplary schedule for multiple persons at multiple locations on a particular day.

Figure 11:
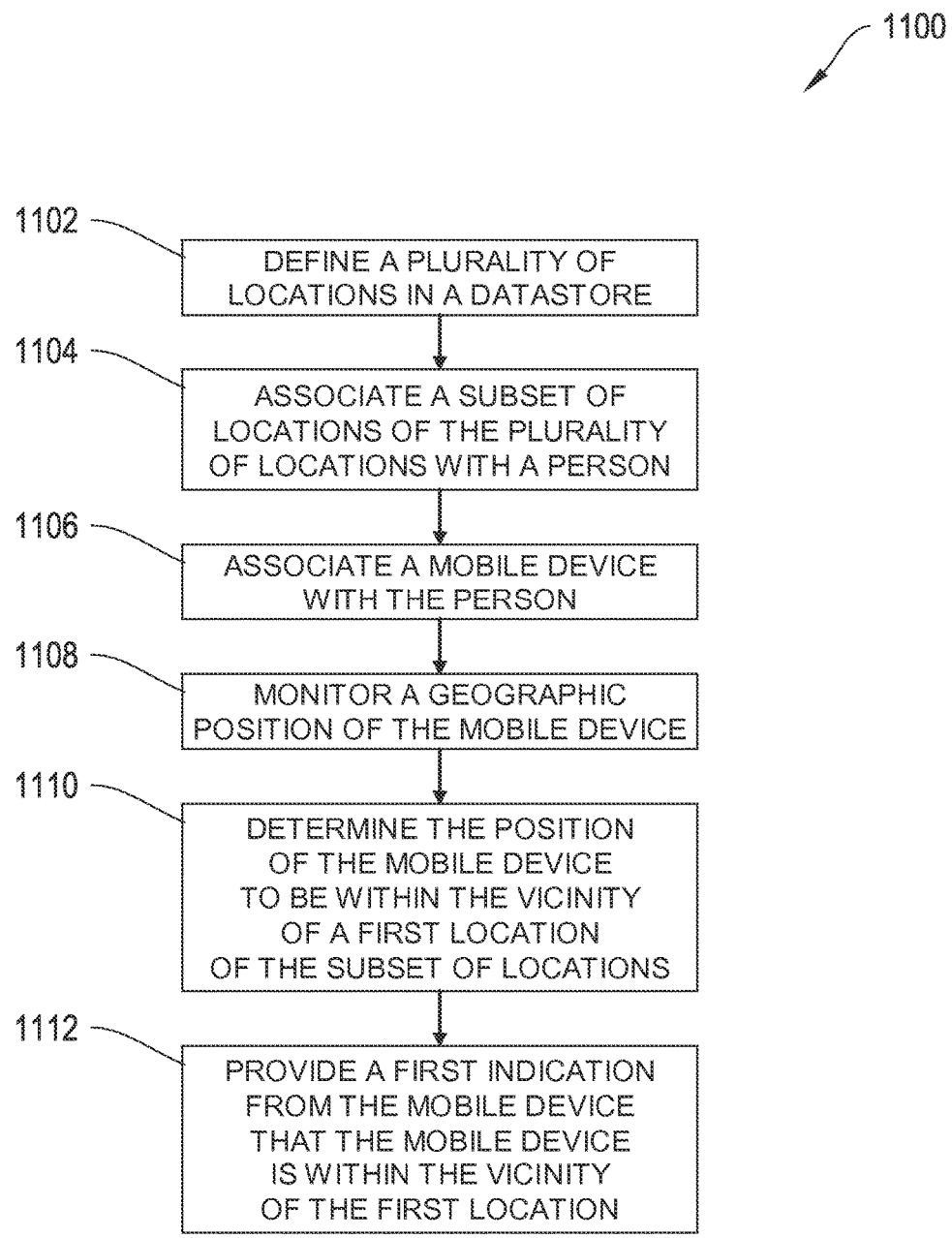

FIG. 11 is a flow diagram of a process for monitoring the presence of a person.

DESCRIPTION

While the applicant's teachings are described in conjunction with various embodiments, it is not intended that the applicant's teachings be limited to such embodiments. On the contrary, the applicant's teachings encompass various alternatives, modifications, and equivalents, as will be appreciated by those of skill in the art.

Figure 1:
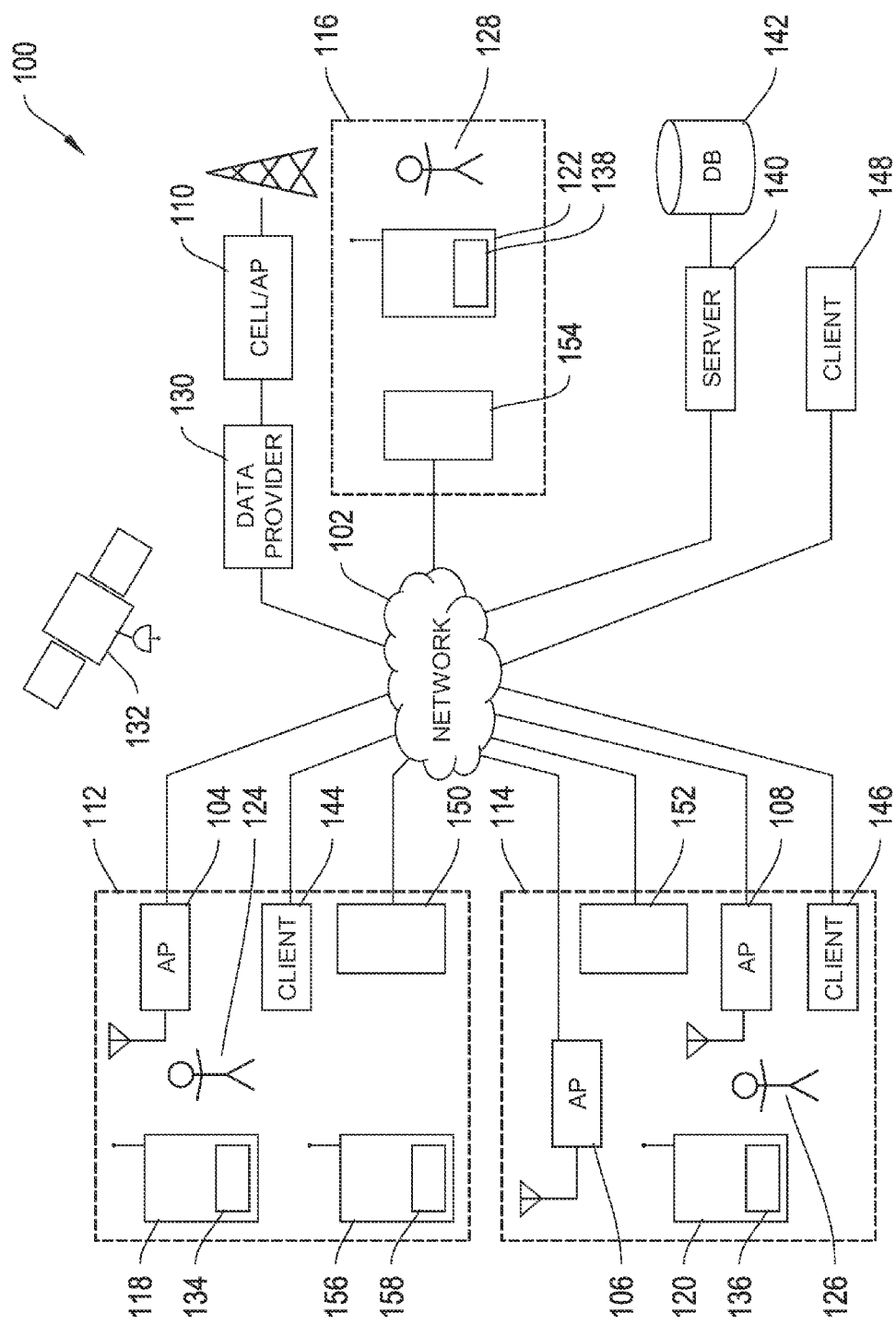

FIG. 1 shows the general architecture of a presence monitoring system 100 according to illustrative aspect of the invention. The system 100 includes a communications network 102 that facilitates data communications among various network elements. The system 100 includes access points (APs) 104, 106, 108, and 110. The AP 104 provides a wireless data connection to a mobile device 118 at location 112. The APs 106 and 108 provide wireless data connections to mobile device 120 at location 114. The AP 110 provides a wireless data connection to mobile device 122 at location 116. Mobile device 118 is associated with or used by person 124. Mobile device 120 is associated with or used by person 126. Mobile device 122 is associated with or used by person 128.

As used herein, the term "wireless" means data is transferred to and/or from a device over a wireless medium. The APs 104, 106, 108, or 110 may use various types of wireless protocols and standards such as time division multiple access (TDMA), code division multiple access (CDMA), 802.11, Wifi, Bluetooth, cellular, GPRS, LTE, EVDO, WiMax, and the like. An AP 104, 106, 108, or 110 can communicate with multiple mobile devices concurrently. AP 110 may also function as a cellular telephone network base station. The data provider 130 may include a public land mobile network (PLMN) or other wireless data provider.

The mobile devices 118, 120, and 122 may include a personal digital assistant (pda), portable computer, cellular telephone, smart phone, radio frequency identifier (RFID), wireless communications device, and the like. The mobile devices 118, 120, and 122 may utilize one or more communications protocols such as 802.11, WiMax, Wifi, GPRS, CDMA, LTE, pager protocols, Bluetooth, a PAN protocol, a wireless LAN protocol, a wide area network (WAN) protocol, or any suitable wireless protocol to enable communications with elements of the system 100.

The mobile devices 118, 120, and 122 may include presence tracking applications 134, 136, and 138 respectively that may utilize a global positioning system (GPS) to determine a geographic positioning of the mobile device by interfacing with a GPS satellite 132. The server 140 or the mobile tracking applications 134, 136, and 138 may interface with a mobile location protocol (MLP) service, a GPS based positioning system, a Wi-Fi based positioning system (WPS or WiPS/WFPS), or other location-based service that enables the server 140 or the mobile tracking applications 134, 136, and 138 to continuously or periodically determine the location of a mobile device 118, 120, 122 respectively. The server 140 or the mobile tracking applications 134, 136, and 138 may utilize commercially available positioning services such as Google location services, Apple location services, Infsoft, Navizon, AlterGeo, Skyhook Wireless, or Combian Mobile. The presence tracking applications 134, 136, and 138 respectively also enable each mobile device 118, 120, and 122 to interface with a presence monitoring server 140 and a presence monitoring database 142.

The system 100 includes at least clients 144, 146, and 148 which may be personal computers or other computing devices that enable a person 124, 126, 128, or some other user to access the presence monitoring server 140 via a user interface such as, for example, a web browser. In some implementations, mobile devices 118, 120, and 122 can be configured to provide a user interface from a user to the server 140. In some configurations, the system 100 also includes kiosks 150, 152, and 154 that are located at locations 112, 114, and 116 respectively. Each kiosk 150, 152, and 154 may be a personal computer or other computing device capable of providing a user interface to the server 140. The user interface of each kiosk 150, 152, and 154 may include a web browser to enable a user to exchange information with the server 140. Each location 112, 114, and 116 can have one or more kiosks in various locations to enable more convenient access by persons. Further details regarding the kiosks is provided later herein.

Figure 2:
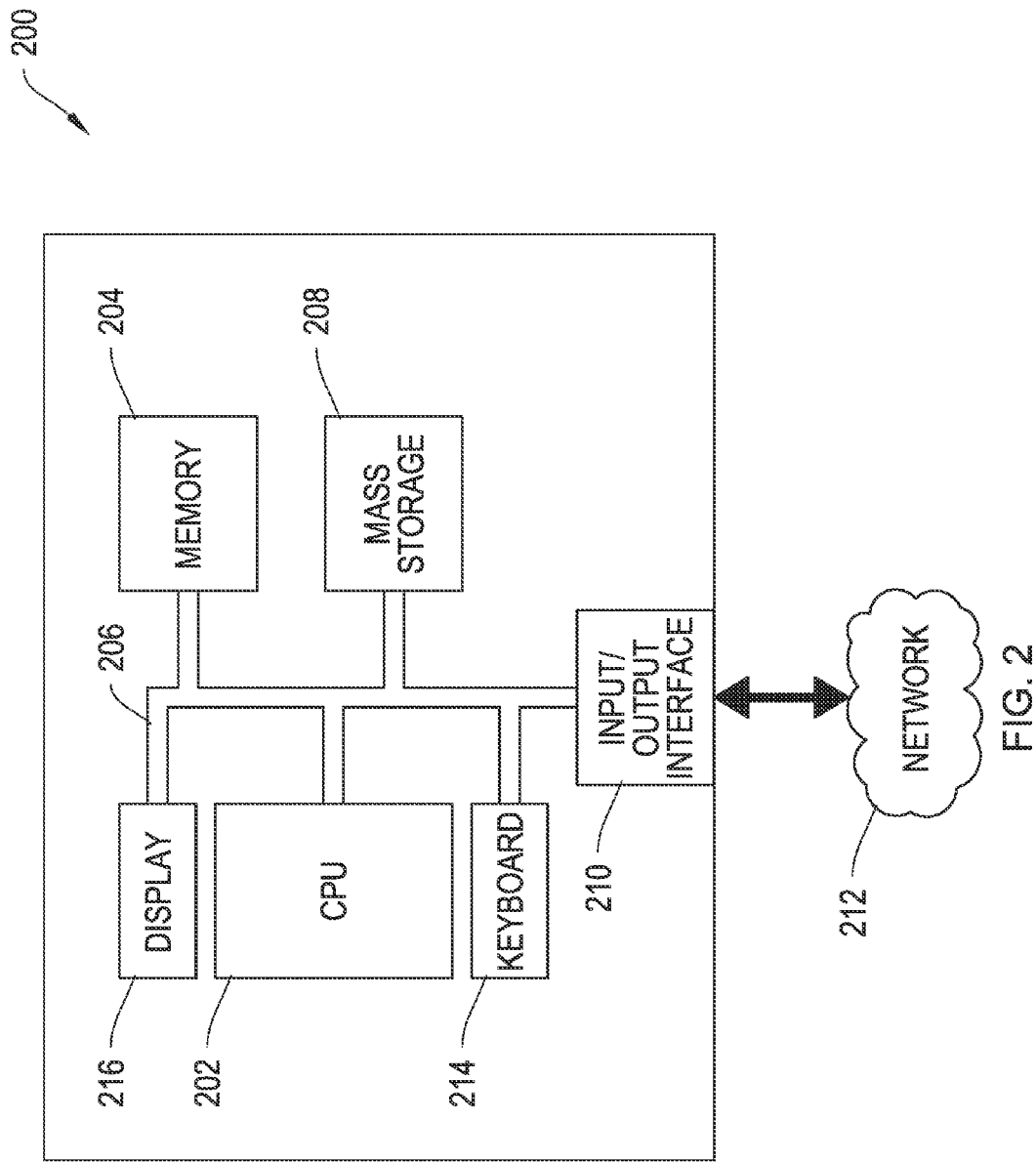

FIG. 2 includes a functional block diagram of a computer system, e.g., mobile device 118, 120, and 122, a client 144, 146, and 148, a server 140, or a kiosk 150, 152, and 154 of FIG. 1. The exemplary computer system 200 includes a central processing unit (CPU) 202, a memory 204, and an interconnect bus 206. The CPU 202 may include a single microprocessor or a plurality of microprocessors for configuring computer system 200 as a multi-processor system. The memory 204 illustratively includes a main memory and a read only memory. The computer 200 also includes the mass storage device 208 having, for example, various disk drives, tape drives, etc. The main memory 204 also includes dynamic random access memory (DRAM) and high-speed cache memory. In operation, the main memory 204 stores at least portions of instructions and data for execution by the CPU 202.

The mass storage 208 may include one or more magnetic disk or tape drives or optical disk drives or solid state memories or memory sticks, for storing data and instructions for use by the CPU 202. At least one component of the mass storage system 208, preferably in the form of a disk drive or tape drive, stores the database used for processing data and/or presence data of the system 100. The mass storage system 208 may also include one or more drives for various portable media, such as a floppy disk, a compact disc read only memory (CD-ROM), or an integrated circuit non-volatile memory adapter (i.e. PC-MCIA adapter) to input and output data and code to and from the computer system 200. The storage system 208 may store presence related data for multiple persons over a period of time to enable the system 200 (or server 140) to analyze the presence data, generate metadata or trend data and charts, and/or to present selected portions of presence data to users or distribute selected portions of data to network elements such as mobile devices 118, 120, and 122, clients 144, 146, and 148, or other devices.

The computer system 200 may also include one or more input/output interfaces for communications, shown by way of example, as interface 210 for data communications via the network 212 (or network 102). The data interface 210 may be a modem, an Ethernet card or any other suitable data communications device. To provide the functions of a network 102 according to FIG. 1, the data interface 210 may provide a relatively high-speed link to a network 212 (or network 102 of FIG. 1), such as an intranet, internet, or the Internet, either directly or through another external interface. The communication link to the network 212 may be, for example, optical, wired, or wireless (e.g., via satellite, Wifi, or cellular network). Alternatively, the computer system 200 may include a mainframe or other type of host computer system capable of Web-based communications via the network 212. The computer system 200 may include software for operating a network application such as a web server and/or web client.

The computer system 200 also includes suitable input/output ports or use the interconnect bus 206 for interconnection with a local display 216 and keyboard 214 or the like serving as a local user interface for programming and/or data retrieval purposes. The display 216 may include a touch screen capability to enable users to interface with the system 200 by touching portions of the surface of the display 216. The display 216 may enable a graphical display on one or more parameters associated with one or more persons 124, 126, and 128 or locations 112, 114, and 116. Server operations personnel may interact with the system 200 for controlling and/or programming the system from remote terminal devices via the network 212.

The computer system 200 may run a variety of application programs and store associated data in a database of mass storage system 208. One or more such applications may enable the receipt and delivery of messages to enable operation as a server, for implementing server functions relating to presence monitoring of persons associated with an entity according to system 100 of FIG. 1.

The components contained in the computer system 200 are those typically found in general purpose computer systems used as servers, workstations, personal computers, network terminals, and the like. In fact, these components are intended to represent a broad category of such computer components that are well known in the art.

As discussed above, the general purpose computer system 200 may include one or more applications that provide presence monitoring and analysis in accordance with features of the invention. The system 200 may include software and/or hardware that implements a web server application. The web server application may include software such as HTML, XML, WML, SGML, PHP (Hypertext Preprocessor), CGI, and like languages.

The foregoing features may be realized as a software component operating in the system 200 where the system 200 is Unix workstation or other type of workstation. Other operation systems may be employed such as, without limitation, Windows, MAC OS, LINUX, and Android. In some embodiments, the monitor, central station, or device software can optionally be implemented as a C language computer program, or a computer program written in any high level language including, without limitation, Python, C++, Fortran, Java, or Visual BASIC. Certain script-based programs may be employed such as XML, WML, PHP, and so on. Additionally, general techniques for high level programming are known, and set forth in, for example, Stephen G. Kochan, Programming in C, Hayden Publishing (1983). Certain aspects of Python programming are discussed in *Learning Python*, ($5^{th}$ Edition) Mark Lutz (2013). The system 200 may use a DSP for which programming principles well known in the art.

As stated previously, the mass storage 208 may include a database. The database may be any suitable database system, including the commercially available Microsoft Access database, and can be a local or distributed database system. The design and development of suitable database systems are described in McGovern et al., A Guide To Sybase and SQL Server, Addison-Wesley (1993). The database can be supported by any suitable persistent data memory, such as a hard disk drive, RAID system, tape drive system, floppy diskette, or any other suitable system. The system 200 may include a database that is integrated with the system 200, however, it will be understood by those of ordinary skill in the art that in other implementations the database and mass storage 208 can be an external element.

In certain embodiments, the system 200 may include an Internet browser program and/or be configured operate as a web server. In some embodiments, the client and/or web server may be configured to recognize and interpret various network protocols that may be used by a client or server program. Commonly used protocols include Hypertext Transfer Protocol (HTTP), File Transfer Protocol (FTP), Telnet, and Secure Sockets Layer (SSL), for example. However, new protocols and revisions of existing protocols may be frequently introduced. Thus, in order to support a new or revised protocol, a new revision of the server and/or client application may be continuously developed and released.

In one implementation, the system 100 includes a networked-based, e.g., Internet-based, application that may be configured and run on a server 140 and/or any combination of the other components of the system 100. The system 100 (including server 140) may include a web server running a Web 2.0 application or the like. The clients 144, 146, 148, mobile devices 118, 120, and 122, and kiosks 150, 152, and 154 may include web clients. Web applications running on the system 100 may use server-side dynamic content generation mechanisms such, without limitation, Java servlets, CGI, PHP, or ASP. In certain embodiments, mashed content may be generated by a web browser via, for example, client-side scripting including, without limitation, JavaScript and/or applets.

In certain embodiments, the system 200 may include applications that employ asynchronous JavaScript+XML (Ajax) and like technologies that use asynchronous loading and content presentation techniques. These techniques may include, without limitation, XHTML and CSS for style presentation, document object model (DOM) API exposed by a web browser, asynchronous data exchange of XML data, and web browser side scripting, e.g., JavaScript. Certain web-based applications and services may utilize web protocols including, without limitation, the services-orientated access protocol (SOAP) and representational state transfer (REST). REST may utilize HTTP with XML.

The mobile devices 118, 120, and 122; clients 144, 146, and 148; and server 140 may also provide enhanced security and data encryption. Enhanced security may include access control, biometric authentication, cryptographic authentication, message integrity checking, encryption, digital rights management services, and/or other like security services. The security may include protocols such as IPSEC and IKE. The encryption may include, without limitation, DES, AES, RSA, and any like public key or private key based schemes.

Returning to FIG. 1, in operation, an entity, e.g., a company, organization, or association, utilizes system 100 to monitor the presence of members or persons associated with the entity. One type of entity is a company that employs multiple employees or persons 124, 126, and 128 who may work at multiple locations 112, 114, and 116. Each location may be a worksite, an office, a facility, a person's home, a residence, a vehicle, or a location where the person's presence is scheduled or expected. The facility may be a hospital, a manufacturing plant, a school, and the like. A facility may include multiple buildings or worksites.

Figure 3:
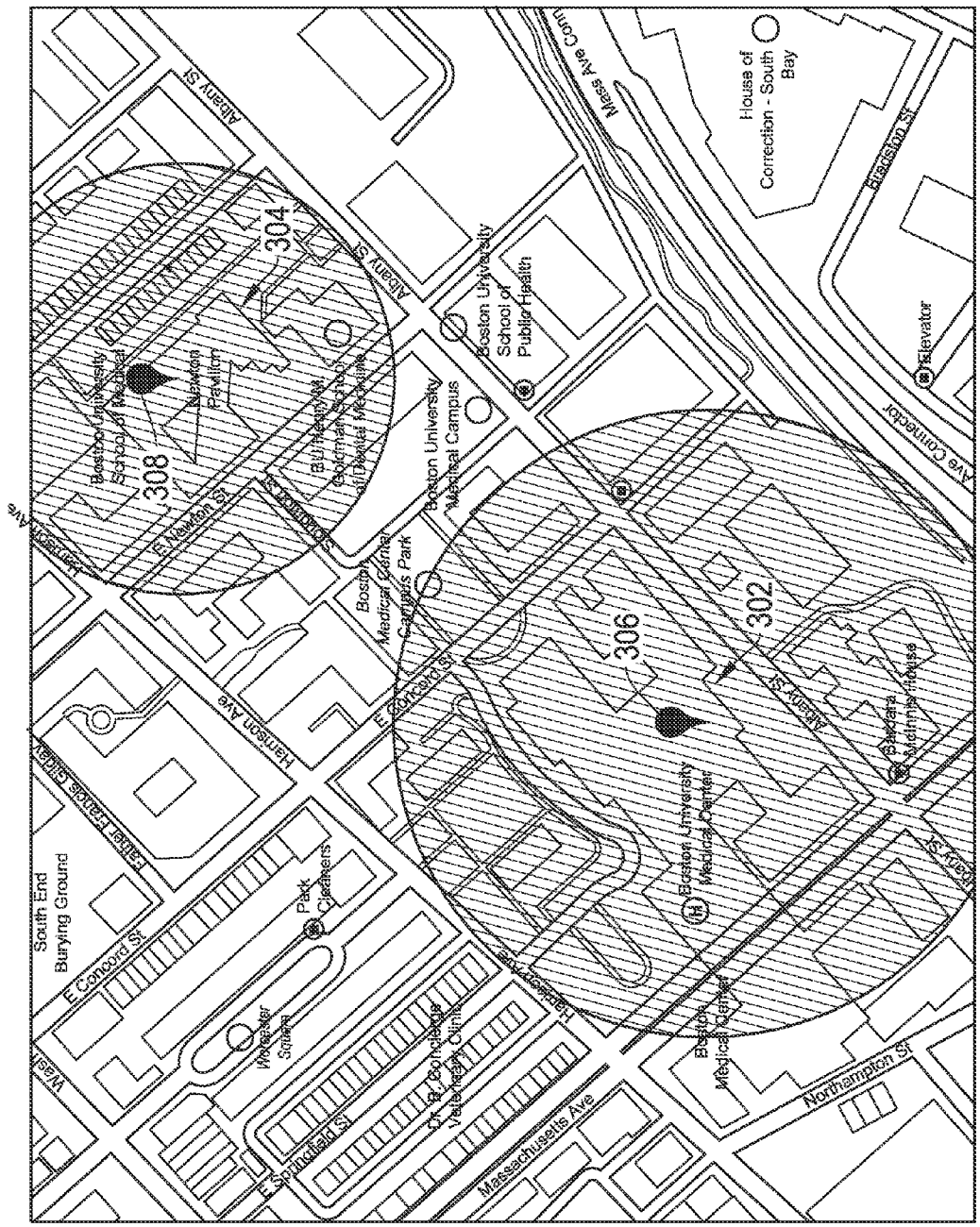
FIG. 3 shows a map indicating the geographic area where a person would be determined to be present for a location.

FIG. 3 shows a map 300 indicating the geographic area where a person 124, 126, or 128 would be determined to be present for a location. In this example, the location is a medical center having at least two geographically separate buildings 302 and 304. Each building 302 and 304 includes an AP 306 and 308 respectively. In a similar manner, FIG. 1 shows APs 106 and 108 being associated with location 114.

Each person can be associated with one or more mobile devices. For example, a person, e.g., person 124, may be associated with mobile device 118 by associating an identifier of the mobile device 118 with an identifier of the person 124. The identifier of the mobile device may be a serial number associated with the mobile device 118 such as, for example, an electronic serial number (ESN), an international mobile equipment identifier (IMEI), an international mobile station identifier (IMSI), a telephone number, a MAC address, an assigned identifier, and the like.

Each person, e.g., person 124, may be associated with multiple identifiers depending on the one or more devices associated with or used by the person 124. An identifier may be derived or generated automatically by hashing or processing certain unique identifiers such as, for example, an IMEI and/or MAC address. As a person 124 moves from location 112 to location 114 or other locations, the system 100 can determine which of the identifiers it should use to determine the presence of the person 124. The system 100 may determine which one or more identifiers to use based on recent activity of the person 124. For example, the person 124 may have a tracking application 134 on their mobile device 118, e.g., an iPhone, and another tracking application 158 on another mobile device 156, e.g., an iPad. The mobile device 118 will generate arrival indication messages and departure indication messages based on its movement into and out of the vicinity of location 112, e.g., a hospital. The mobile device 156 may generate online indication messages when it is located away from any location 112, 114, and 116, but is, for example, at the home of person 124. The system 100 can, therefore, dynamically infer that mobile device 156 should not be used to monitor the presence of person 124.

Instead, the system 100 will use mobile device 118 to monitor the presence of person 124. The system 100 can dynamically infer that the data associated with the identifier of mobile device 118 is the data that the system 100 should use to monitor the presence of the person 124 instead of the data from the mobile device 156. If, at another time, the system 100 determines that the mobile device 118 is online, but not moving among one or more locations while the mobile device 156 is moving among one or more locations, then the system will dynamically infer that the data associated with the identifier of mobile device 156 is the data that the system 100 should use to monitor the presence of the person 124. In some implementations, a parser application 712 of a server 140 or 712 of FIG. 7 dynamically determines which mobile device and data to use by the system 100 to monitor the presence of a person.

The system 100 may use a name, employee number, social security number, driver license number, passport number, or other identifier as an identifier of the person 124. The person 124, the presence monitoring server 140, or the tracking application 134 may assign an identifier to the mobile device 118 and/or an identifier associated with the person 124. In certain implementations, the database 142, or another datastore includes a data table or list of identifiers of persons along with their corresponding mobile device identifiers. Hence, the table or list associates a person with one or more mobile devices.

For an entity that has multiple facilities in different geographic locations, the database 142 may store a list of the multiple locations 112, 114, and 116 of the entity. A first subset of locations of the multiple locations 112, 114, and 116 may be associated with a person 124. If the person 124 only works at locations 112 and 114, then the first subset of locations consists of locations 112 and 114. In one implementation, the system 100 enables the person 124 to configure the first subset to include locations 112 and 114, while excluding location 116. The system 100 can also enable other persons to configure other subsets. For example, the person 126 may configure a second subset of locations to consist of locations 114 and 116. By enabling a person to configure a subset of locations where the system 100 determines if the person is present, the system 100 advantageously enhances the privacy of the person by not tracking the person's location, via their associated mobile device, except only in a subset of locations designated by the person.

FIG. 4 shows a screen shot of an exemplary user interface 400 arranged to receive a user input to configure the subset of locations associated with a person. The user interface includes a list of a plurality of locations arranged in two columns 402 and 404. The person, e.g., employee A, can select which locations to be included in a subset of the plurality of location associated with employee A. In the exemplary interface 400, a slide bar 408 enables a user to select or unselect a particular location. For example, BMC East Newton is selected by the slide bar being positioned to the "on" position. BOSS is not selected or unselected by the slide bar being positioned to the "off" position. The user interface 400 may be provided by a client 144, 146, and 148; a mobile device 118, 120, and 122, or any computer capable of interfacing with the presence monitoring server 140. Using the user interface 400, a user can upload the selected subset of locations to the server 140 by selecting the submit button 406. Once submitted to the server 140, the sever 140 may store the subset of locations in the database 142 in a table or list that associates the subset of locations with the person. The subset of locations may be stored in other locations such as a memory in a mobile device 118, 120, and 122. A person of ordinary skill will appreciate that the user interface 400 may be configured in various other arrangements to enable a user to select a subset of locations.

In certain configurations, a tracking application such as application 134 of mobile device 118 accesses a memory on the mobile device 118 and/or the database 142 to determine the subset of locations associated with person 124. The tracking application 134 interfaces with a location based service (e.g., a Wifi location service), a GPS receiver of the mobile device 118, or some other location determining mechanism, to determine whether the mobile device 118 is within a vicinity of a location such as location 112. The tracking application 134 may only send an indication that the mobile device 118 is at the location 112 to the presence monitoring server 140 when the mobile device 118 is within the vicinity of location 112 and only if location 112 is a location included in the subset of locations that have been designated for the person 124. The tracking application 134 may send an arrived notification when the tracking application 134 first determines that the mobile device 118 is within the vicinity of location 112. The tracking application 134 may periodically send a present notification to the server 140 while the mobile device is within a vicinity of a location of the subset of locations. The tracking application 134 may send a departed notification to the server 140 when the mobile device 118 has departed from the vicinity of a location of the subset of locations designated for a person.

In some implementations, the subset of locations associated with a person is configured by a supervisor or administrator of the person via, for example, a user interface at client 148 or another device capable of interfacing with the server 140. By enabling a supervisor or administrator to configure a subset of locations where the system 100 determines if the person is present, the system 100 advantageously enhances the privacy of the person by not tracking the person's location except only in a subset of locations designated by the supervisor or administrator.

In an alternate implementation, the system 100 tracks the location of a person, via their associated mobile device, in all locations associated with an entity. For example, the server 140 may include an application that interfaces with a mobile location protocol (MLP) service, a GPS based positioning system, a Wi-Fi based positioning system (WPS or WiPS/WFPS), or other location-based service, e.g., that enables the server 140 to continuously or periodically determine the location of a mobile device 118, 120, or 122. The server 140 may utilize commercially available positioning services such as Google® location services, Apple® location services, Infsoft, Navizon, AlterGeo, Skyhook Wireless, or Combian Mobile, and similar commercially available services. In this implementation, the system 100, however, enables a person, supervisor, or administrator to designate a subset of locations associated with a person. Based on the designated subset of locations, the presence monitoring server 140 only processes data or provides information associated with the subset of locations that was designated. While the server 140 may gather location information related to any location, enhanced privacy is still provided because only information related to the subset of locations is processed or made available to administrators, supervisors, or others. Hence, in this alternate configuration, the use or disclosure of a person's location information is determined by the server 140 as opposed to being determined by the presence tracking application, e.g., application 134, of a mobile device such as mobile device 118.

An employee, such as person 124, is expected to keep their associated mobile device 118 in their possession. When the person 124 moves into the vicinity of a location such as location 112, the mobile device 118, using presence tracking application 134, determines that it is in the vicinity of location 112 and, in response, determines whether the location 112 is one of a subset of locations. If location 112 is one of the locations in the subset of locations associated with the employee, the mobile device 118 sends an indication that it has arrived at location 112, via AP 104 and network 102, to the presence monitoring server 140. The indication may be a data message including various information that the server 140 stores in database 142 associated with the employee.

FIGS. 5A-B show a portion of an exemplary data log file 500 including information received from mobile devices, such as information included in indication messages, showing when a person arrived, was present, and departed a location. The data log file 500 includes multiple rows of data, where each row includes information associated with an indication message from a mobile device such as mobile device 118. Column 502 includes a timestamp that indicates the date and time when a message is received by the server 140 and stored in the database 142. Column 512 includes a timestamp that indicates the date and time when an effect has actually occurred and an indication message was generated by a tracking application in a mobile device such as mobile device 118. In one implementation, the data and time is based on UNIX Epoch Time. In some implementations, the system 100 uses the timestamps of column 512 to determine whether a person has arrived or departed a location. For example, if there is a network 102 outage or a loss of connection between a mobile device 118 and server 140, then the server 140 will receive indication or notification messages when the outage or loss of connection is resolved. It could take an extended period of time to re-establish a connection between the mobile device 118 and the server 140, resulting in the timestamp in column 502, which indicates when a message is received by the server 14, being an inaccurate indication of when the mobile device 118 arrived or departed from a location. Hence, instead of relying on the time when an indication message is received in column 502, the system 100 can use the timestamp generated by the tracking application 134 of mobile device 118 as shown in column 512. In this way, for example, the system 100 more accurately tracks the presence of person 124 based on a more accurate determination of the arrival and departure of mobile device 118.

Column 504 includes status information regarding the status of the mobile device that sent the message. The term "arrived" indicates that the mobile device has arrived at a location. The term "present" indicates that the mobile device is present at a location. The term "departed" indicates that the mobile device has departed from a location. The term "online" indicates that the mobile device is operating, but no location information is reported from the mobile device or stored by the database 142 because the actual location of the mobile device is not within the vicinity of a designated subset of locations.

Column 506 lists the name of the location, e.g., BMC Menino, associated with a message received in each row of the data log file 500. Column 508 lists the operating system and software version associated with the mobile device. Column 510 lists the identifier of the mobile device. The data log file 500 can be continuously and incrementally updated as the database 142 receives indication messages from a mobile device. Hence, the data log file provides a history of the presence of a mobile device and the presence of the person in possession of the mobile device.

In another implementation, a person may not want to use a mobile device to automatically provide presence information to the presence monitoring server 140. Instead, the person, such as person 124, can manually notify the server 140 that they have arrived at a location such as location 112 by using a kiosk 150, which is at the location 112, to submit when the person 124 arrives or departs from location 112.

FIG. 6 shows a screen shot of an exemplary user interface 600 of a kiosk 150, 152, and 154 arranged to receive a user input to indicate when a person has arrived or departed from a location. The user interface 600 includes a login interface 602 that enables a person to sign in with a username and password and select "arriving" or "departing" for a selected location. Alternatively, if the person needs to submit presence information for a different date and time, the person can use login interface 604 to sign in and then specify the date, time, location, and arriving or departing indication. The person will also need a co-signer to login to confirm the person's submission. The option for login interface 604 enables a person to submit missed arrival or departure indicators to the system 100. Because the submission is not contemporaneous, a cosigner may be needed to ensure that arrival and departure information is accurate and/or legitimate. In one implementation, the kiosk 150, 152, and 154 submits the information provided via the user interface 600 to the server 140 and database 142 which may store the information in a data log file such as the data log file 500 of FIGS. 5A-B.

FIG. 7 includes a functional block diagram of a presence monitoring system 700 including a mobile device 702, kiosk 704, and a presence monitoring server 706. The presence monitoring server 706 includes a data analyzer application 710 parser application 712, and data collector application 714. The presence monitoring system 700 may be included as part of the presence monitoring system 100 of FIG. 1. FIG. 7 shows that presence information is sent from a mobile device 702 and/or a kiosk 708 to a data collector application 714 of the server 706 or sever 142. The presence information may include information provided in an indication message or as included in, for example, the data log file 500. The data collector application 714 may receive presence information directly from a mobile device 702 or kiosk 704, and/or may receive information stored within the database 716 or database 142 of FIG. 1. The data collection application 714 may store presence information in one or more tables, lists, or files such as, for example, data log file 500 within database 716 or 142.

In one configuration, a parser application 712 receives presence information from the data collector application 714 or database 716. The parser application 712 processes, arranges, organizes, and/or formats the presence information associated with one or more persons into a human readable parsing or format. In some implementations, the parser application 712 of a server 140 or 712 of FIG. 7 dynamically determines which mobile device and data to use to track and/or determine the presence of a person.

FIGS. 8A-B include a screen shot of a parsed data information page 800 showing presence information for multiple persons at multiple locations over a week period. The data information page 800 lists multiple employees in column 802 by their initials ADA, ALD, so on. Presence information for each employee is provided on each row. For example, employee ADA was present at locations on Tuesday, Wednesday, Thursday, and Friday. On Wednesday, employee ADA was present at location NEBH. Column 804 lists the total time present or hours worked by ADA for Week 24 as 21.0 hours. Column 806 lists the difference in hours between the hours actually worked by a person and the hours that the person was scheduled to work such as shown in the schedule 1000 of FIGS. 10A-B.

FIGS. 8A-B illustrate, for example, the amount of work and the location where employees worked over a week period. The information in bold includes data from a schedule such as shown in FIGS. 10A-B. The information in regular typeface includes data generated by the presence monitoring system 100 and, for example, server 140. More particularly, FIGS. 8A-B show that employee BLI frequently worked slightly longer hours than he was scheduled. On Tuesday, BLI went to the location "Hawthorne" even though he was scheduled to only work at location "Morton." On Thursday, BLI went to the "Hawthorne" location and "SLH" location which is consistent with the scheduling information in bold typeface. By the end of the week, the total number of hours that BLI had worked was 4.1 hours more than scheduled, which is shown as "4.1" hours in column 806.

As illustrated in FIGS. 8A-B, the presence monitoring system 100 can access automatically-generated employee presence information, scheduling information, and other information associated with multiple employees moving among multiple locations. Using such information, the system 100 can analyze workflows, generate schedules, and/or adapt schedules and resources more efficiently to address the need of an entity or business. While presence information for a week is shown, other periods of time may be displayed. Also, information associated only with one or particular subset of employees may be displayed. The display of information may be based on other parameters such as location.

The data analyzer application 710 may process the presence data from one or more persons along with other information to develop future presence or work schedules for employees. The other information may include projected or expected presence or work needs at one or more locations or the expected availability of employees on certain days or times. For example, the data analyzer 710 may receive proposed vacation schedules from multiple employees. The data analyzer 710 may then compare the projected schedules of employees, the presence or work needs at one or more locations, the history of the amount the presence of one or more employees to determine a future work or presence schedule for one or more employees.

FIG. 9 includes a functional block diagram of a configuration of a presence monitoring system 900 where certain data is protected from public access. As discussed above with respect to creating a presence or work schedule, certain information regarding persons and/or employees may include sensitive or private information that should be protected from public disclosure. Certain information may be subject to privacy requirements or laws such as, for example, personal healthcare information (PHI). The system 900 is an optional variation of system 100 where certain functions of the server 140 and database 142 are performed in a publicly accessible portion 902 of the system 900 on network 914 by server 916, while protected functions are performed in a private portion 904 of the system 900 on network 912 by server 906. Also, private information may be stored in the database 908. The public portion 902 is separated form the private portion by a firewall 910.

FIG. 9 illustrates how persons or employees 930 and 932 can access the presence monitoring statistical server 916 via clients 922 and 924 respectively. The employees 930 and 932 may interact with server 916 to obtain presence information such as illustrated in FIGS. 8A-B. A scheduling person 926 may use client 918 to submit scheduling information to the scheduling server 906 and database 908. Also, a human resources person 928 may submit personal information regarding an employee 930 or 932 via client 920 to the scheduling server 906 and database 908. The scheduling server 906 may then gather various information including private information from database 908 and presence information from statistical server 916 to create a presence or work schedule for the employees 930 and 932. In one implementation, the data collector application 714 and parser application 712 reside within the statistical server 916, while the data analyzer or scheduler application 710 resides within the scheduling server 906. While the firewall may allow statistical or historical data to flow from the public portion 902 to the private portion 904, the firewall only allows a final employee schedule to be delivered to the statistical server 916 for access by the employees 930 and 932.

FIGS. 10A-B show a screen shot of an exemplary schedule 1000 for multiple persons at multiple locations on a particular day. The schedule 1000 includes multiple locations such as BH, Shattuck, MAH, BMC, NEBSC, QMC, and so on. The schedule 1000 lists the initials of the employees that are scheduled to be present at each facility on Monday, Jun. 13, 2014. For example, employees ATT, DOU, and RIS are scheduled to be at location OSC. The schedule status 1002 indicates if the schedule is pending or FINAL. The schedule 1000 includes a notes section 1004. The schedule further includes contact information for scheduling personal.

FIG. 11 is a flow diagram of a process 1100 for monitoring the presence of a person. First, a system, such as system 100, defines a plurality of locations associated with an entity and stores that information in a data store such as database 142. (Step 1102). Then, a person 124, such as in system 100, associates a subset of locations of the plurality of locations with the person 124. The person 124 may associate a subset of the plurality of locations using, for example, user interface 400 to select or unselect locations displayed by the user interface. (Step 1104). The system 100 associates a mobile device, such as mobile device 118, with the person 124. The mobile device 118 may be associated with the person 124 by storing an identifier of the person 124 with an identifier of the mobile device 124 together in table or list within the database 142. (Step 1106). The system 100 monitors a geographic position of the mobile device 124. The monitoring may be performed by the mobile device 124 itself or the presence monitoring server 140 may utilize a position service as previously discussed to monitor the position of mobile device 124. (Step 1108).

Either the mobile device 118 or server 140 determines the geographic position of the mobile device 118 to be within a vicinity of a first location, e.g., location 112, of the subset of locations, e.g., locations 112 and 114. If the mobile device 118 is using GPS based positioning, the tracking application 134 may use a threshold distance from a defined position associated with the location 112. If the mobile device 118 is within the threshold distance of the defined position, then the mobile device 118 is determined to be within the vicinity of the location 112. If the mobile device is outside the threshold distance from the defined position, then the mobile device 118 is determined to not be within the vicinity of the location 112. If Wifi based positioning is being used, then the position may be based on whether the mobile device 118 is communicating with or receiving data from a particular Wifi access point known to be at or within a vicinity of the location 112. (Step 1110). Then, the mobile device 118 provides a first indication from the mobile device 118 that the mobile device 118 is within the vicinity of the first location 112. (Step 1112).

Those skilled in the art will recognize that the methods, systems, and devices used to determine the presence of a person can also be applied to non-persons such as, without limitation, animals, robots, vehicles, and other mobile entities.

It will be apparent to those of ordinary skill in the art that certain aspects involved in the operation of the device 118, tracking application 134, and/or server 140 may be embodied in a computer program product that includes a computer usable and/or readable medium. For example, such a computer usable medium may consist of a read only memory device, such as a CD ROM disk or conventional ROM devices, or a random access memory, such as a hard drive device or a computer diskette, or flash memory device having a computer readable program code stored thereon.

Those skilled in the art will know or be able to ascertain using no more than routine experimentation, many equivalents to the embodiments and practices described herein. Accordingly, it will be understood that the invention is not to be limited to the embodiments disclosed herein, but is to be understood from the following claims, which are to be interpreted as broadly as allowed under the law.

What is claimed is:

1. A method for determining the presence of a person comprising:
    defining a plurality of locations in a data store;
    providing a user interface arranged to receive a user input, from a mobile device, to configure a first subset of locations of the plurality of locations to be monitored and a second subset of locations of the plurality of locations to not be monitored;
    storing the first subset and the second subset of the plurality of locations on the mobile device;
    associating the first and second subsets of locations of the plurality of locations with the person;
    associating the mobile device with the person;
    monitoring a geographic position of the mobile device;
    determining the geographic position of the mobile device to be within a vicinity of a first location of the plurality of locations;
    determining the first location to be among the first subset of locations but not among the second subset of locations; and
    providing a first indication from the mobile device that the mobile device is within the vicinity of the first location.

2. The method of claim 1 further comprising determining that the geographic position of the mobile device is not within the vicinity of the first location and providing a second indication that the mobile device has departed from the vicinity of the first location.

3. The method of claim 2 further comprising storing history data associated with a presence of the mobile device at the first subset of locations.

4. The method of claim 3 further comprising analyzing the history data to determine presence information associated with the person.

5. The method of claim 4 further comprising using the presence information associated with the person to determine a future presence schedule for the person.

6. The method of claim 2, wherein determining that the mobile device is or is not within the vicinity of the first location is based on at least one of a distance between the mobile device and the first location, a distance between the mobile device and an access point, and whether the mobile device is connected to or communicating with one or more access points.

7. The method of claim 1, wherein the first indication includes an arrival or presence notification.

8. The method of claim 7, wherein the second indication includes a departure notification.

9. The method of claim 1, wherein the mobile device includes at least one of a cellular telephone, a personal digital assistant, a mobile computer, a smart phone, a radio frequency identifier, and a wireless communications device.

10. The method of claim 1, wherein the person is at least one of an employee of a company and a member of a private or governmental organization or association.

11. The method of claim 1, wherein the plurality of locations includes at least one of a worksite, an office, a facility, the person's home, a residence, a vehicle, and a location where the person's presence is scheduled.

12. A system for determining the presence of a person comprising:
 a data store for storing a plurality of locations;
 a mobile device arranged to i) provide a user interface arranged to receive a user input to configure a first subset of locations of the plurality of locations to be monitored and a second subset of the plurality of locations to not be monitored; ii) monitor the geographic position of the mobile device; iii) store the first subset and the second subset of the plurality of locations; iv) determine that the geographic position of the mobile device is within a vicinity of a first location of the plurality of locations; v) determine that the first location is among the first subset of locations but not among the second subset of locations; and vi) provide a first indication that the mobile device is within the vicinity of the first location; and
 a server in communication with the mobile device and arranged to i) associate the first and second subsets of locations of the plurality of locations with the person and ii) associate the mobile device with the person.

13. The system of claim 12, wherein the mobile device determines that the geographic position of the mobile device is not within the vicinity of the first location and provides a second indication that the mobile device has departed from the vicinity of the first location.

14. The system of claim 13, wherein the server stores history data in the data store associated with a presence of the mobile device at the first subset of locations.

15. The system of claim 14, wherein the server analyzes the history data to determine presence information associated with the person.

16. The system of claim 14, wherein the server uses the presence information associated with the person to determine a future presence schedule for the person.

17. The system of claim 13, wherein determining that the mobile device is or is not within the vicinity of the first location is based on at least one of a distance between the mobile device and the first location, a distance between the mobile device and an access point, and whether the mobile device is connected to or communicating with one or more access points.

18. The system of claim 17, wherein the first indication includes an arrival or presence notification.

19. The system of claim 18, wherein the second indication includes a departure notification.

20. The system of claim 12, wherein the mobile device includes at least one of a cellular telephone, a personal digital assistant, a mobile computer, a smart phone, a radio frequency identifier, and a wireless communications device.

21. The system of claim 12, wherein the person is at least one of an employee of a company and a member of a private or governmental organization or association.

22. The system of claim 12, wherein the plurality of locations includes at least one of a worksite, an office, a facility, the person's home, a residence, a vehicle, and a location where the person's presence is scheduled.

23. A mobile device comprising:
 a memory for storing a plurality of locations; and
 a processor arranged to i) provide a user interface arranged to receive a user input to configure a first subset of locations of the plurality of locations to be monitored and a second subset of the plurality of locations to not be monitored; ii) store the first subset and the second subset of locations of the plurality of locations in the memory; iii) monitor the geographic position of the mobile device; iv) determine that the geographic position of the mobile device is within a vicinity of a first location of the subset of locations; v) determine that the first location is among the first subset of locations but not among the second subset of locations; and vi) provide, to a server, a first indication that the mobile device is within the vicinity of the first location.

* * * * *